united States Patent [19]

Kondo et al.

[11] Patent Number: 4,630,590
[45] Date of Patent: Dec. 23, 1986

[54] INTERNAL COMBUSTION ENGINE APPARATUS

[75] Inventors: Tadashige Kondo, Nerima; Hisashi Inaga, Suginami, both of Japan

[73] Assignee: Kioritz Corporation, Tokyo, Japan

[21] Appl. No.: 744,694

[22] Filed: Jun. 14, 1985

[30] Foreign Application Priority Data

Jun. 27, 1984 [JP] Japan ............................. 59-95182[U]

[51] Int. Cl.$^4$ ................................................ F02P 5/04
[52] U.S. Cl. ...................................... 123/602; 123/418
[58] Field of Search ................................. 123/418, 602

[56] References Cited

U.S. PATENT DOCUMENTS

| 3,861,372 | 1/1975 | Shibukawa | 123/602 |
| 3,880,133 | 4/1975 | Katsumata | 123/602 |
| 3,898,972 | 8/1975 | Haubner | 123/602 |
| 4,345,553 | 8/1982 | Magrane | 123/602 |
| 4,412,522 | 11/1983 | Fujimoto | 123/418 |

Primary Examiner—Ronald B. Cox
Attorney, Agent, or Firm—Browdy and Neimark

[57] ABSTRACT

An internal combustion engine apparatus including an internal combustion engine having an ignition system and a centrifugal clutch. The ignition system is capable of being in delayed ignition timing in a range of low engine speeds and being in advanced ignition timing in a range of high engine speeds while quickly changing ignition timing stepwise when the engine speed is at a predetermined level between the low and high engine speed ranges, and the centrifugal clutch is switched between a condition of engagement and a condition of disengagement at an engine speed in the vicinity of the predetermined engine speed. The apparatus retains the advantages of an internal combustion engine having a centrifugal clutch and allows a machine for which the apparatus is used to make effective use of engine output power. The apparatus has improved engine startup characteristic and increased engine stability and is free from engine stall when the centrifugal clutch is not fully engaged.

2 Claims, 1 Drawing Figure

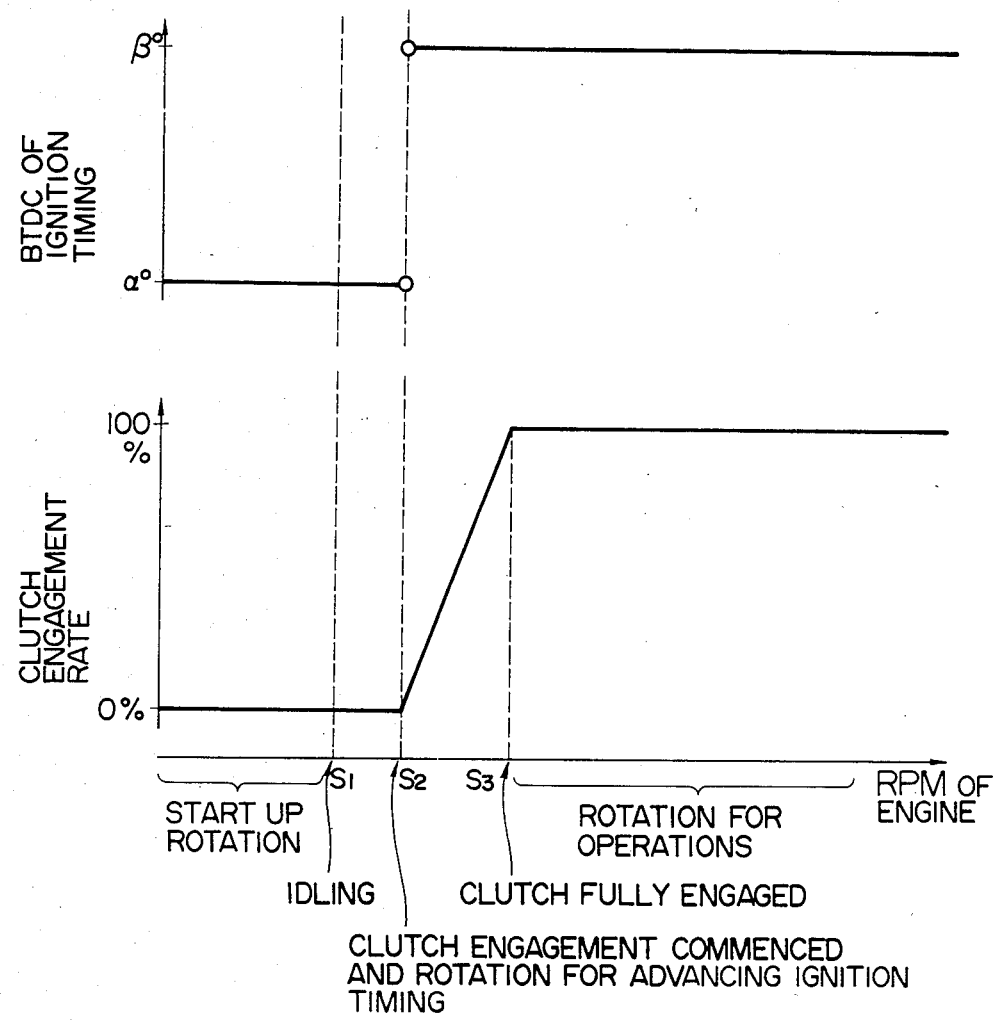

INTERNAL COMBUSTION ENGINE APPARATUS

BACKGROUND OF THE INVENTION

This invention relates to internal combustion engine apparatus having no speed governor, and more particularly it is concerned with an internal combustion engine apparatus suitable for use with a chain saw, a mowing machine, a sprayer, etc., of a portable type.

In one type of engine apparatus known in the art, a centrifugal clutch is combined with an internal combustion engine having an ignition system adapted to operate with a substantially constant ignition timing in all the ranges of engine speed. Meanwhile, there has been a demand for an internal combustion engine apparatus in which a centrifugal clutch is combined with an internal combustion engine having an ignition system capable of being in delayed ignition timing in a low engine speed range, being in advanced ignition timing in a high engine speed range and changing ignition timing stepwise in an intermediate engine speed range, so as to improve engine performance and operation efficiency.

However, this demand has not been met yet. The problems that have to be obviated to enable the desired internal combustion engine apparatus to be provided are as follows. In the low engine speed range in which ignition timing is delayed, the output power of the engine is low. If an attempt is made to engage the clutch while the engine is in this condition, then the engine stalls before the clutch is fully engaged, thereby preventing a further rise in engine speed. Even if the engine stall is avoided, it is inevitable that acceleration rate in the rpm of the engine speed is lessened.

SUMMARY OF THE INVENTION

This invention has been developed for the purpose of obviating the aforesaid problems of the prior art. Accordingly, the invention has as its object the provision of an internal combustion engine apparatus retaining the advantages of an internal combustion engine having a centrifugal clutch and capable of making effective use of engine output power when the machine equipped with this internal combustion engine apparatus performs operations while improving engine startup characteristic and the stability of the engine during idling without the engine stalling when the centrifugal clutch is not fully engaged.

The aforesaid object is accomplished according to the invention by combining an internal combustion engine having an ignition system with a centrifugal clutch supported on an output shaft of the engine to provide an internal combustion engine apparatus wherein the ignition system is capable of quickly changing ignition timing when the engine operates at a predetermined speed between a high engine speed range and a low engine speed range, and the centrifugal clutch is engaged and disengaged when the engine operates substantially at the predetermined speed.

BRIEF DESCRIPTION OF THE DRAWING

The single drawing is a diagram showing operation characteristics of the internal combustion engine apparatus according to the invention.

DESCRIPTION OF THE PREFERRED EMBODIMENT

The invention will now be described by referring to a preferred embodiment, in which the internal combustion engine is idling at a speed $S_1$ as shown in the single drawing. When the engine is in this condition, the ignition system maintains an advance angle $\alpha$ to cope with delayed ignition timing and the centrifugal clutch is disengaged, with the clutch shoe being out of contact with the clutch drum.

When the throttle lever of the engine is actuated and the engine speed rises from $S_1$ to $S_2$ which is slightly higher than $S_1$, the ignition timing of the ignition system instantaneously changes from the advance angle $\alpha$ for delayed ignition timing to an advance angle $\beta$ for advanced ignition timing. At the same time, the centrifugal clutch begins to be engaged. As the engine speed further rises from $S_2$ to $S_3$, the centrifugal clutch is fully engaged, so that the engine speed enters a range of speeds for allowing the machine to operate. Meanwhile, the ignition system is still maintained at the ignition timing of $\beta$. In the internal combustion engine apparatus according to the invention, it is essential that the timing with which the ignition is advanced stepwise substantially match the timing with which the centrifugal clutch is engaged. If this requirement is met, it is possible to use an ignition system and a centrifugal clutch known in the art to constitute the internal combustion engine apparatus according to the invention.

As one example, the internal combustion engine apparatus according to the invention was incorporated in a chain saw and comprised an internal combustion engine which is a small, air-cooled, two-cycle gasoline engine, an ignition system as disclosed in Japanese Patent Publication No. 18790/81 and a centrifugal clutch of ordinary construction. In this constructional form, the centrifugal clutch is connected at its input side to an output shaft of the internal combustion engine and a clutch shoe is brought, when the engine speed risen to $S_2$ in the drawing, into sliding engagement with a clutch drum on the output side of the centrifugal clutch by centrifugal forces exerted thereon, so that the centrifugal clutch begins to be engaged. When the engine speed reaches $S_3$ or the minimum speed in the range of engine speeds allowing the machine to operate, the centrifugal clutch is fully engaged and transmits rotation smoothly without any loss from the input side to the output side.

With the constructional form described hereinabove, the centrifugal clutch operates smoothly and transmits motive force efficiently from the internal combustion engine to the chain saw.

The invention has been described as being incorporated in a chain saw as one example. However, it is to be understood that the invention is not limited to this example and that it is capable of achieving similar effects when applied to a mowing machine or a sprayer.

What is claimed is:

1. An internal combustion engine apparatus comprising, in combination,
    an internal combustion engine having an ignition system capable of step advance when a predetermined engine speed is reached between low and high ranges of engine speed; and
    a centrifugal clutch connected to an output shaft of said internal combustion engine, said centrifugal clutch being engaged and disengaged at substantially said predetermined engine speed.

2. The internal combustion apparatus of claim 1, wherein said ignition system is in a state of delayed ignition timing in a range of low engine speed below engine idling and advanced ignition timing in a range of high engine speed.

* * * * *